United States Patent
Pirot et al.

(10) Patent No.: US 6,738,331 B2
(45) Date of Patent: May 18, 2004

(54) COPY-PROTECTED OPTICAL DISK AND PROTECTION PROCESS FOR SUCH DISK

(75) Inventors: François-Xavier Pirot, Magny (FR); Jean-Louis Duhamel, Morsang S/orge (FR); Marc Des Rieux, Le Mans (FR); François Le Carvennec, Senlisse (FR)

(73) Assignees: Thomson-CSF, Paris (FR); part interest; MPO International, Averton (FR); part interest ( * ) Notice: Subject to any disclaimer, the term of this patent is extended or adjusted under 35 U.S.C. 154(b) by 415 days.

(21) Appl. No.: 09/779,606

(22) Filed: Feb. 9, 2001

(65) Prior Publication Data

US 2001/0024411 A1 Sep. 27, 2001

(30) Foreign Application Priority Data

Feb. 11, 2000 (FR) ............................................ 00 02042

(51) Int. Cl.⁷ ................................................ G11B 7/085
(52) U.S. Cl. ................ 369/53.21; 369/30.1; 369/275.3; 369/275.4
(58) Field of Search ................................ 369/284, 286, 369/282, 288, 275.3, 283, 275.4, 120, 175, 47.35, 59.17, 61, 109.01, 275.5, 116, 44.35, 44.29, 53.21, 44.34, 30.1, 30.28, 59.26; 346/137; 250/317.1, 318, 316.1; 711/164; 156/230, 300; 705/59; 264/102; 714/699; 713/176

(56) References Cited

U.S. PATENT DOCUMENTS

| | | | |
|---|---|---|---|
| 3,909,608 A | 9/1975 | Le Merer et al. | 369/109.01 |
| 4,037,251 A | 7/1977 | Bricot et al. | 369/109.01 |
| 4,038,524 A | 7/1977 | Puech et al. | 369/61 |
| 4,142,208 A | 2/1979 | Oprandi et al. | 714/699 |
| 4,157,931 A | 6/1979 | Bricot et al. | 156/230 |
| 4,176,277 A | 11/1979 | Bricot et al. | 250/316.1 |
| 4,387,452 A | 6/1983 | Bricot et al. | 369/30.28 |
| 4,405,862 A | 9/1983 | Bricot et al. | 250/318 |
| 4,551,733 A | 11/1985 | Cornet et al. | 346/173 |
| 4,868,804 A | 9/1989 | Le Carvennec et al. | 369/44.34 |
| 5,260,930 A * | 11/1993 | Maeda | 369/275.3 |
| 5,475,672 A | 12/1995 | Le Carvennec | 369/47.35 |
| 5,680,386 A | 10/1997 | Le Carvennec et al. | 369/116 |
| 5,854,778 A * | 12/1998 | Shimizu et al. | 369/59.26 |
| 5,864,526 A | 1/1999 | Le Carvennec | 369/44.29 |
| 6,091,697 A | 7/2000 | Le Carvennec et al. | 369/275.1 |
| 6,286,087 B1 * | 9/2001 | Ito et al. | 711/164 |
| 6,381,588 B2 * | 4/2002 | Oshima et al. | 705/59 |
| 6,490,683 B1 * | 12/2002 | Yamada et al. | 713/176 |
| 6,577,561 B2 * | 6/2003 | Pirot et al. | 369/30.1 |

FOREIGN PATENT DOCUMENTS

| | | |
|---|---|---|
| FR | 2 769 119 | 4/1999 |
| JP | 8-147767 | 6/1996 |

* cited by examiner

*Primary Examiner*—William Korzuch
*Assistant Examiner*—Kim-Kwok Chu
(74) *Attorney, Agent, or Firm*—Oblon, Spivak, McClelland, Maier & Neustadt, P.C.

(57) ABSTRACT

The disclosure relates to an optical disk of the type including at least one spiral track on which information marks are written in sectors whose addresses are substantially sequential along the track, wherein said disk includes a copy protection zone (PZ) comprising two parts of equal size each including a series of sectors designated by identical addresses on each of the two parts, the data written in this zone being shared between the sectors of the two parts, each sector of the zone also carrying an identifier (D1, D2) characteristic of the part to which the sector belongs, and specific protection data to enable verification of the presence and constitution of said protection zone (PZ) and to enable use of the data written in this zone, at least part of said specific protection data being recorded on said disk. The invention is notably applicable to anti-piracy protection of CD-ROM and DVD-ROM type disks.

26 Claims, 4 Drawing Sheets

COPY-PROTECTED OPTICAL DISK AND PROTECTION PROCESS FOR SUCH DISK

BACKGROUND OF THE INVENTION

The invention relates to a copy-protected optical disk of the type including at least one continuous spiral, and a copy-protection process to determine whether such a disk is an original or an illegal copy. The invention is notably applicable to CD-ROM and DVD-ROM type disks.

DESCRIPTION OF THE PRIOR ART

It is well known, notably in the software field, that developers of products suffer considerable financial loss due to illicit copying (also known as "piracy"). This situation has recently been further aggravated by the availability on the mass consumer market of optical disk recorders that can write CD-R and CD-RW type disks that are very inexpensive to buy. Such devices can make perfect copies of the original CD-ROMs.

Numerous techniques have therefore been developed, in particular in recent years, to prevent illegal copying of optical disks. One of the simplest of these consist in writing a copy protection code at a pre-determined location on the disk during its fabrication. This pre-determined location is such that many copying techniques cannot reproduce this part of the disk. Readers are made to reject disks that do not have the protection code in the right location. However, it is obvious that a device designed or adapted to read all data at all locations on the disk can copy the disk including its protection code; the illegal copy obtained is then strictly identical to the original.

Another known technique is the SCMS ("Serial Copy Management System") method according to which a disk carries a SCMS code that authorizes or forbids copying. A disk with a SCMS code authorizing copying can be copied, but the copying device changes the SCMS code so that further copies are not possible. It is clear that this technique suffers the same disadvantage as previously when the entire data content of the disk is copied.

Other relatively sophisticated techniques have been imagined to overcome the problem of unauthorized copying. Most of them involve the use of a specific "signature" on the disk, which can consist in a variation of certain recording parameters, such as the form of the marks (depth, width, length), introduction of an asymmetry in the marks, wobbulation of the track at special frequencies, and so on. These variations constitute the signature that must be sought by the reader, and they cannot be reproduced by ordinary CD writers such as CD-R recorders. However, it is necessary that the disk reader be able to detect these variations, which is not generally the case with standard readers. A variant of this method enables creation of ambiguous code words that can be read with different values at successive reads of the disk with standard readers.

A different technique consists in deliberately destroying or damaging original disk's spiral turns or sectors whose addresses can be encrypted to constitute a disk identifier code. However, one disadvantage of this type of technique is that it necessitates authentication of the disk's user by means of more-or-less complex access information that the user must enter as a password to gain access to the content of the disk, via an authentication terminal. This technique therefore imposes non-negligible constraints. Another disadvantage of such methods of recognition of damaged parts is that they are able to hide only a small quantity of data, which makes it easier to incorporated them in the body of the software. Another problem is that the writing of such marks is structurally within the capabilities of commercially-available CD recorders, the only obstacle to recopying of disks being that the software controlling these CD recorders is unable to manage such marks, errors or omissions. A modification of the control software (either the user processor or the internal software of the CD recorder) would however be sufficient to copy these disks. We note here that the damaging of the disk can be simply limited to the omission of certain sectors.

To attempt to overcome some of these drawbacks and strengthen the security of anti-piracy systems making use of hidden codes, other techniques have been developed involving an interrupted spiral or a spiral with separated zones between which the data are written in such a manner as to prevent continuous recording of executable data. Such techniques may however imply reduced data density on the disk, or may require the use of non-standard readers.

One more promising avenue of development has been envisaged involving a disk with a continuous spiral or main track between whose turns is inserted a section of a secondary spiral, the standard pitch (separation) of the conventional optical disk tracks being conserved. An authentication method then consists in "recognizing" the secondary spiral only by verifying the presence of identification codes or specific addresses that are not found on the main track. However this technique does not apply efficiently the major advantage of having a zone that is not easily reproducible by a standard CD recorder.

SUMMARY OF THE INVENTION

The present invention overcomes these disadvantages and makes full use of the advantage of a such zone that prevents straightforward copying by standard CD recorders, thanks to recognition of the physical presence of a protection zone in two parts.

The invention is therefore a copy-protected optical disk of the type including at least one spiral track on which information marks are written in sectors whose addresses are substantially sequential along the track, wherein said disk includes:

a copy protection zone comprising two parts of equal size each including a series of sectors designated by identical addresses on each of the two parts, the data written in this zone being shared between the sectors of the two parts and each sector of the zone also carrying an identifier characteristic of the part to which the sector belongs; and at least specific protection data to enable verification of the presence and constitution of said protection zone and to enable use of the data written in this zone, at least some elements of said specific protection data being recorded on said disk.

The advantage of the existence of a two-part protection zone is particularly important if one of the parts is written on a secondary track inserted between turns of the main track, since standard CD recorders are unable to write such a two-track disk, and it can be made very difficult to make any illegal copy of a disk by verifying the physical structure of the disk read. Furthermore, even a modification of the control electronics of an industrial device used to make master disks would not enable duplication of disks protected according to the invention.

The invention also includes an optical disk such as defined above, characterized in that it includes a main continuous spiral track covering all the useful part of the disk and whose sectors have addresses ordered substantially sequentially along this track, and at least one secondary track inserted between turns of said main track, the sectors on this secondary track and the adjacent sectors in a given radial direction on said main track having the same addresses, in order to constitute said two parts of said protection zone.

The invention also includes a copy-protection process to determine whether an optical disk is an original disk or an illegal copy and prevent normal use in the case of a copy, said original disk including at least one spiral track on which information marks are written in sectors whose addresses are substantially sequential along the track, said process being characterized in that it consists in:

defining on the original disk a protection zone in two parts of equal size each including a series of sectors designated by identical addresses on each of the two parts, the data written in this zone being shared between the sectors of the two parts and each sector of the zone also carrying an identifier (D1, D2) characteristic of the part to which the sector belongs;

performing a succession of reads of at least one predetermined sector of said protection zone;

verifying, by means of said identifiers, that during these reads, access has been made to the two predetermined sectors having the same address in each of two said parts of said protection zone.

BRIEF DESCRIPTION OF THE DRAWINGS

The invention will be better understood and other characteristics and advantages will become clear on reading the following description of a preferred embodiment, given only as a non-limitative example, with reference to the attached drawings of which.

DETAILED DESCRIPTION OF A PREFERRED EMBODIMENT

Figure 1:
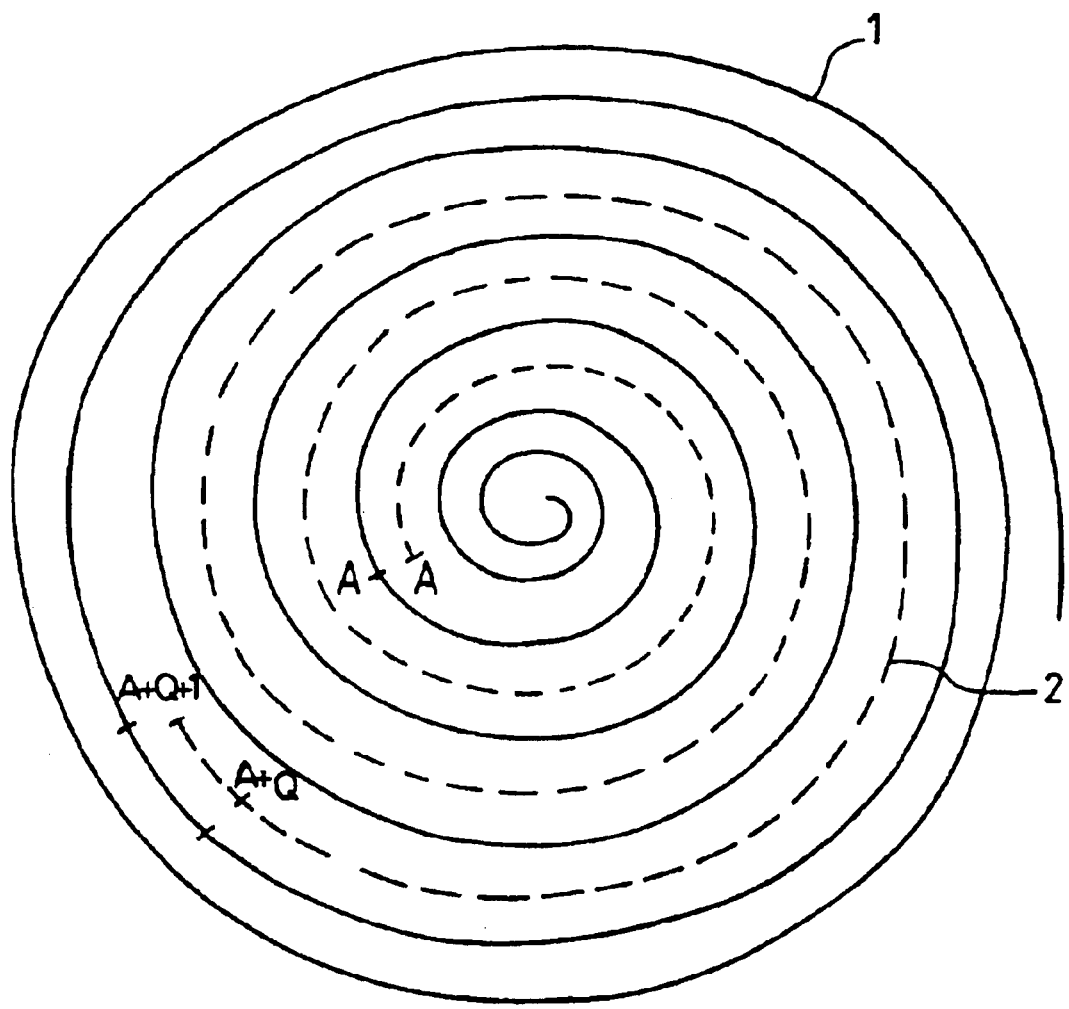
FIG. 1 represents an optical disk according to a first variant of the invention.

FIG. 1 shows a preferred embodiment of the invention in which the copy-protected optical disk includes a main track 1 in continuous spiral covering all the useful section of the disk and whose sectors have, in a known manner, addresses ordered substantially sequentially along this track. A secondary track 2 is inserted between successive turns of the main track, in a manner such that the pitch of the track remains, substantially in all parts of the disk, constant and equal to the standard pitch generally used in classic optical disks, such as CD-ROM and also DVD type disks. We note that the pitch between turns of the main track becomes progressively larger before the start of the secondary track 2, then progressively smaller after the end of the secondary track, returning to the standard value. Thanks to these very progressive variations of the pitch, the radial tracking of the tracks is assured without any risk of servomechanism errors that would be caused by a sudden enlargement of the pitch. The read head can therefore correctly follow the main track even in the zone adjacent to the secondary track.

A characteristic of the invention is that in the zone where the main track and secondary tracks coexist the sectors of these two tracks are designated by the same addresses A to A+Q.

Figure 2:
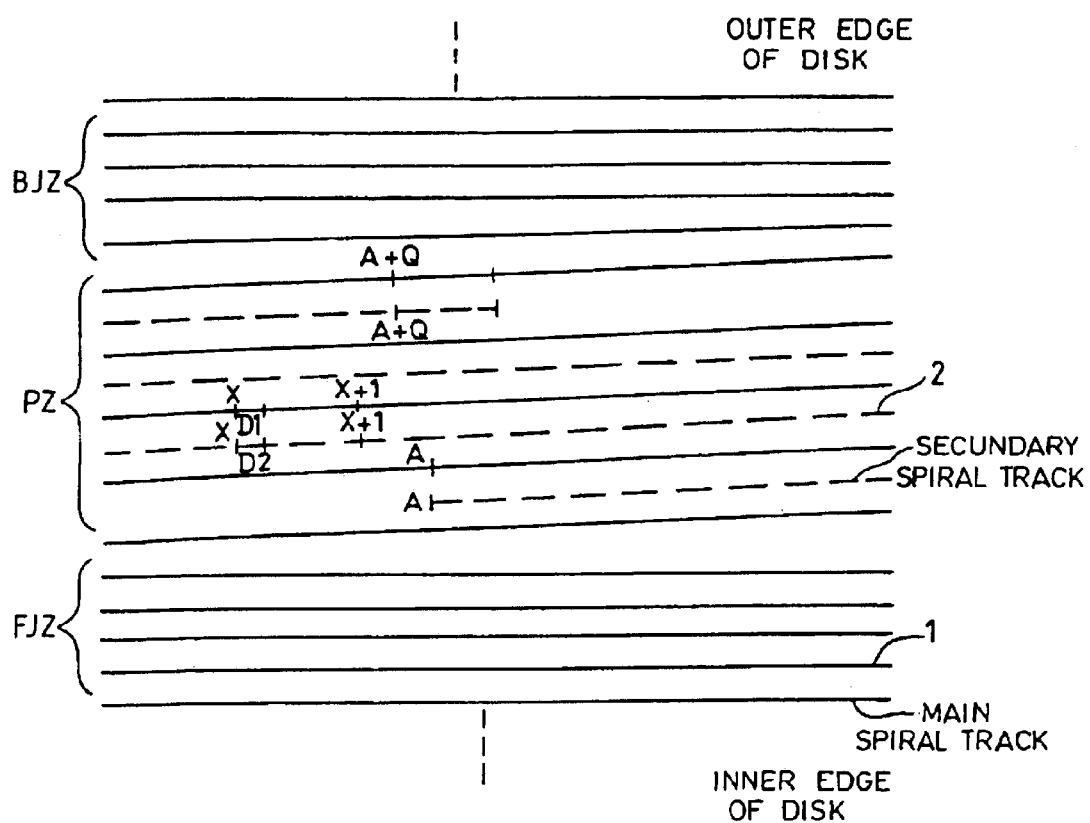
FIG. 2 is a representation in linear form of the turns of the spiral on the disk in FIG. 1.

FIG. 2 represents a linear presentation of the same disk, each turn of a track being represented by a segment extending from left to right across the figure. The main spiral track starts near the center of the disk (at the bottom of the figure) and ends near the outer edge (at the top of the figure).

The zone in which the main and secondary tracks with the same sector addresses A to A+Q coexist is referred to as the "protection zone" PZ.

In addition, a forward jump zone FJZ is defined including turns of the main track having sectors of addresses less than or significantly less than the first address A of the zone PZ; a backward jump zone BJZ is defined including turns of the main track having sectors of addresses larger than or significantly larger than the last address A+Q of the zone PZ.

As an example, we can choose zones FJZ and BJZ of about 1800 sectors located at about 200 sectors before and after the protection zone PZ. The latter can have a size adapted to the data that need to be written there. We can choose for example to include a start zone of about 40 sectors whose first 30 sectors are not readable and the 10 following serve as a locking zone for the reading, then the data protection zone itself of size equal to 235 sectors, which gives a zone PZ of 275 sectors. Of course, these sizes are purely indicative and depend on the data to be hidden that are written in the two parts (main track and secondary track) of the zone PZ.

Each sector of the two parts of the zone PZ contains an identification information or identifier, D1 for the main spiral and D2 for the secondary spiral, so as to differentiate the two spirals.

In addition, in any zone (or in several different zones) of the disk, specific protection information is recorded to check the presence and constitution of the zone PZ and enable use of the data written in this zone. This specific information makes use of the copy-protection process according to the invention, schematized in FIG. 3.

The initialization stage 100 sets to 0 a parameter n corresponding to the number of successive reads carried out on a given sector of address X in the zone PZ. The principle of the process according to the invention consists in performing a series of reads of a sector of address X (or several sectors) of the zone PZ in order to check that it is possible to read the two sectors of same address of the zone PZ, which confirms the existence of the two parts with the same addresses in the zone PZ.

Obviously a standard reader performing successive reads always in the same conditions has statistically a high probability of always reading the sector of the same part. Therefore, starting from an address less than the address A, it has a high probability of always reading the secondary spiral since, for a given address, it is this track that is presented first and is normally selected. Inversely, starting from an address greater than A+Q, it is normally the main track that will be selected.

Therefore, the process according to the invention includes a series of reads from the forward jump zone FJZ, for example N1 reads at most, followed by a series of reads from the backward jump zone BJZ up to a total number $N_{max}$ of reads.

After the initialization 100, we verify, 101, that the number of reads already performed is less than N1. If this is the case, we carry out a jump in the zone FJZ (102), then the reader receives the order to read the sector of address X in the zone PZ. It reads this sector (103) and its identifier (104) and memorizes (105) this identifier D for the $n^{th}$ read (denoted D(n)). This identifier read is compared (106) with the previous identifier read and memorized. If the two identifiers are identical (reading of the same track), which is most probable, we perform a new read (after checking (107) that we have not reached the predetermined maximum number $N_{max}$ of reads) and increment (108) the number n. If, due to a perturbation, during these N1 reads, the reader falls on the main track and on its sector X, then the identifier read, D1, is different from the previous identifier and we continue (113) reading the disk or, preferably, continue using the specific protection information that can include the reading of all the sectors of the two tracks of the protection zone PZ to collect all the hidden data.

If, after N1 reads, we have read only the sector X of the secondary track, then at the read N1 (101), we perform a jump in the zone BJZ (109) and continue performing the operations 103, 104, 105, 106. There is now a high probability that the sector of address X read is on the main track. At the first read on this track, the identifier D1 will be different from the previous identifier and we then perform the rest (113) of the operations.

On the other hand, if we reach $N_{max}$ reads (107) without having found two different identifiers, we then start reading a sector of another address X+q (110) of the zone PZ, where q is an integer chosen between 1 and Q (maximum), if we consider that a verification by the protection sub-program of a single address can be insufficient for various reasons notably related to the behavior of the reader. For the new address X=X+q, we check (111) that it is in the zone PZ, then we reset n to zero (112) and restart the execution of verification program. If, after the verification of a certain number of sectors, we find (111) that we have exited the protection zone PZ without having encountered the two different identifiers, we conclude (114) that the verification has failed and that the disk is not an original disk but an illegal copy.

We can then decide to stop the reading, in which case the reader could display a message, or eject the disk.

Another possibility is to continue reading so that the application executes but in degraded mode. To do this, we can imagine that the information parts of the application recorded on the disk, that are normally hidden on the secondary track, are replaced on the main track by "lure" data such that the application continues executing but in a degraded form by reading the data (genuine data and lure data) only on the main track. In this manner the reader does not stop and it becomes more difficult to detect and understand the protection system in use.

The presence of the secondary track is a major advantage of the system just described, since this cannot be written by a conventional CD recorder. The physical existence of this track can be verified by any means such as identification of the secondary track, or its positioning and length, which further enhances the efficiency of the anti-piracy system.

We note here that the identifiers, instead of being identification information specifically written in each sector of the zone PZ, could be implicit, in the sense that the process according to the invention consists in checking that we have read the information of the two tracks for a given sector address, which means we confirm the presence of both tracks. It is therefore understood that, when we speak of identifier or identification information, this may be the useful data itself that is effectively read.

Figure 4:
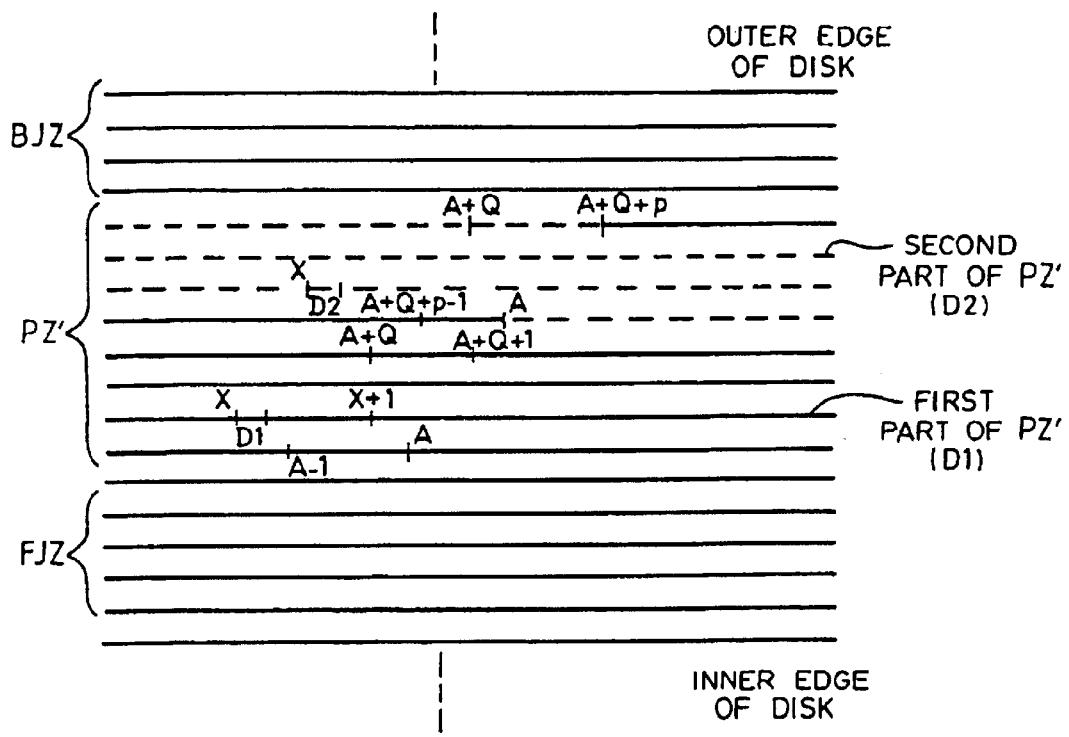
FIG. 4 is a representation in linear form of a second variant of an optical disk protected according to the invention.

FIG. 4 shows a variant of a copy-protected disk that uses the same process as the previous one. In this variant, the disk includes a single continuous spiral track. As before, we define a protection zone PZ that includes two parts each having the same number of sectors with the same addresses A to A+Q. These two parts may directly following one another or may be separated by a certain number p−1 of sectors as in FIG. 4, the addresses of these intermediate sectors following sequentially those of the first part of the zone PZ'. Here again, the sectors of each part include an identifier, D1 for the first part, D2 for the second.

Figure 3:
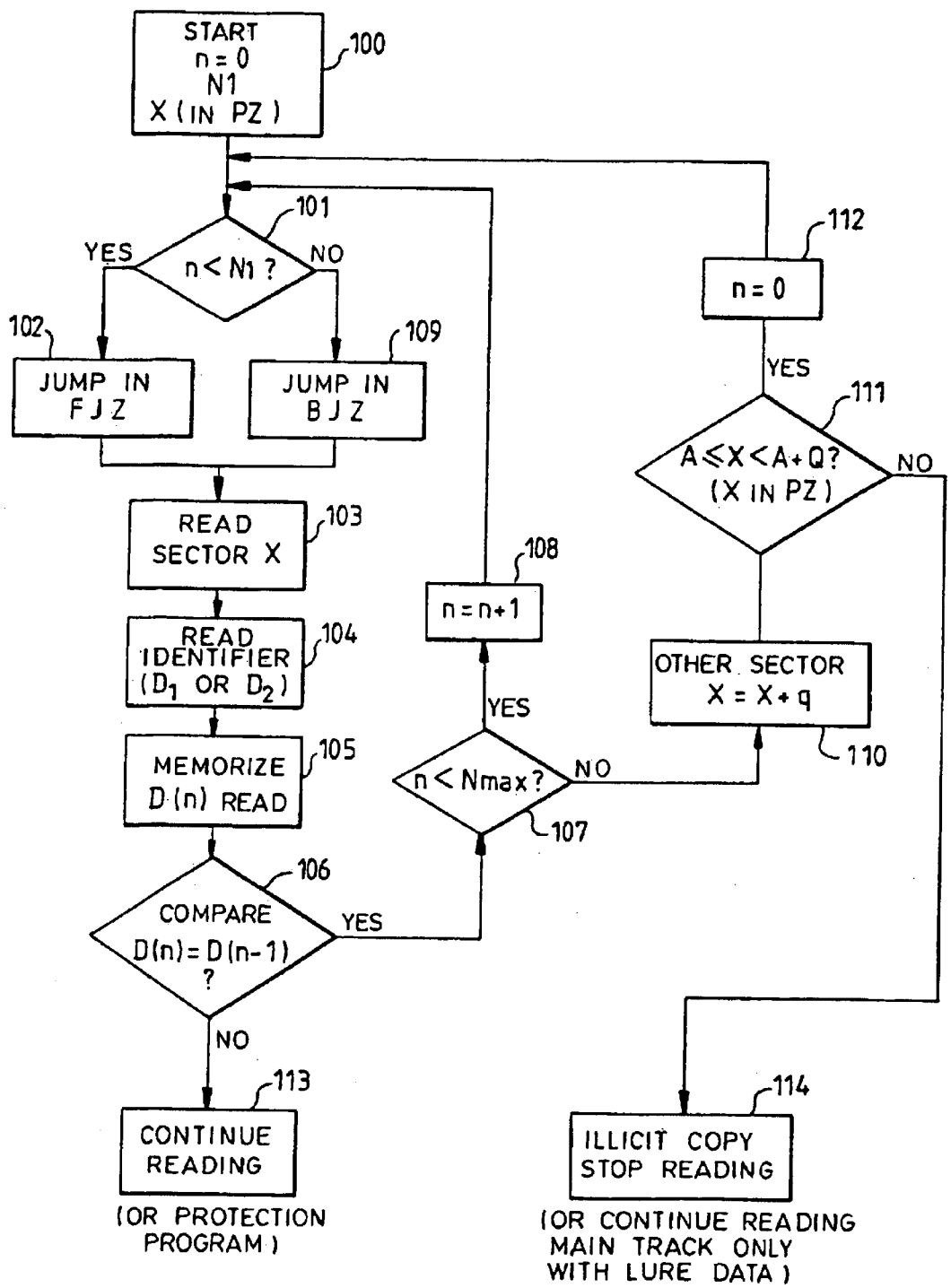
FIG. 3 is an operational flow chart of the protection program according to the invention.

In this variant, the protection process described by the flow chart in FIG. 3 is applicable without modification.

We note that the two variants are distinguished by the physical presence or absence of the secondary track.

The time required for reading operations also offers an alternative means of verification that the disk read is an original disk, with one or two spiral tracks depending on the embodiment. For example, the following simplified procedure can be used to check the physical presence of a secondary track according to the invention:

Step 1: Reading, from an address significantly less than the address A, of one or more sectors of addresses X (where X ranges from A to A+Q), in other words in the zone PZ, and detection of the identifier of these sectors. This stage is that already described in the flow chart in FIG. 3 (101, 102, 103, 104, 105) for n<N1.

Step 2: Reading, from an address significantly greater than A+Q, of sectors of addresses X (where X ranges from A to A+Q), in other words in the zone PZ, and detection of the identifier of these sectors. This stage is that already described in the flow chart in FIG. 3 (101, 109, 103, 104, 105) for n between N1 and $N_{max}$.

Step 3: Reading, from an address significantly less than the address A, in other words in the zone FJZ, of successive sectors of address A to A+Q, detection of the identifier and measurement of the time $t_3$ necessary for this reading.

Step 4: Reading, from an address significantly less than the address A, in other words from the zone FJZ, of successive sectors of address A to A+Q+p (p is an integer of small value compared with Q), detection of the identifier and measurement of the time $t_4$ necessary for this reading.

Step 5: Reading, from an address significantly greater than the address A+Q, in other words in principle from the zone BJZ, of successive sectors of address A+Q−k (k is an integer of small value compared with Q) to A+Q+p and detection of the identifier.

From these five steps, we can consider that the disk read has a double spiral structure if the three following conditions are satisfied:

A. The two identifiers D2 and D1 are detected during the successive steps 1 and 2.

B. The times t3 and t4, measured during the steps 3 and 4, differ only by a small amount that depends on the number p chosen.

C. The reading in step 5 is possible and the identifier for the sectors A+Q−k to A+Q is that detected during step 2 (the identifier for the sectors A+Q+1 to A+Q+p can be absent).

The conditions A and B alone are sufficient to distinguish the physical existence of the secondary track in most cases. The condition C is used to eliminate the remaining cases when there is a doubt as to the satisfaction of conditions A and B.

A disk protected according to the invention therefore offers much improved protection against piracy and guarantee detection of illicit copies.

It will be clear to professional of the art that the embodiments described above are in no way limitative. In particular, it is clear that we can invert the order of the two tracks or the two parts with the same addresses from the interior to the exterior of the disk: in this case the identifiers in the conditions A to C above are simply inverted. Although the description above relates to a single secondary track on the disk, it is clear that the invention is totally applicable when there are several secondary tracks (or track sections) at several different places on the disk. The invention is also applicable to the case of two parallel spirals, in which case the protection zone could use, for example, only part of these spirals.

What is claimed is:

1. A copy-protected optical disk of the type including at least one spiral track on which information marks are written in sectors whose addresses are substantially sequential along the track, wherein said disk comprises:

a copy protection zone comprising two parts of equal size each including a series of sectors designated by identical addresses on each of the two parts, the data written in this zone being shared between the sectors of the two parts and each sector of the zone also carrying an identifier characteristic of the part to which the sector belongs; and at least specific protection data to enable verification of the presence and constitution of said protection zone and to enable use of the data written in this zone, at least some elements of said specific protection data being recorded on said disk.

2. An optical disk according to claim 1, wherein the optical disk includes a continuous spiral track covering all of a useful part of the disk and whose sectors have addresses ordered substantially sequentially along this a main track, and at least one secondary track inserted between turns of said main track, the sectors on the secondary track and the adjacent sectors in a given radial direction on said main track having the same addresses, to constitute said two parts of said protection zone.

3. An optical disk according to claim 2, wherein said insertion of said secondary track in said main track is carried out to maintain the normal pitch of the spiral track over substantially the whole disk.

4. A copy-protection process to determine whether an optical disk is an original disk or a copy and to prevent normal use of a copy, said original disk including at least one spiral track on which information marks are written in sectors whose addresses are substantially sequential along the track, said process comprising:

defining on the original disk a protection zone in two parts of equal size each including a series of sectors designated by identical addresses, the data written in the protection zone being shared between the sectors of the two parts and each sector of the protection zone also carrying an identifier characteristic of the part to which the sector belongs;

performing a succession of reads of at least one predetermined sector of said protection zone;

verifying, by said identifiers, that during the succession of reads, access has been made to the two predetermined sectors having a same address in each of two said parts of said protection zone.

5. A copy-protection process according to claim 4, further comprising defining on the original disk a forward jump zone and a backward jump zone on either side of the said protection zone, and said succession of reads includes making a first series of reads starting from the forward jump zone and a second series of reads starting from the backward jump zone.

6. A process according to claim 4, wherein, when said stage of verification of access to said predetermined sector does not enable access to the two sectors of the same address in each of two said parts of said protection zone, said stage is repeated on other sectors of said protection zone.

7. A process claim 4, in which the original disk includes a continuous spiral main track covering all of a useful part of the disk and whose sectors have addresses ordered substantially sequentially along this track, and at least one secondary track inserted between the spirals of the main track, wherein same addresses are assigned to successive sectors on said secondary track and to the sectors substantially adjacent in a given radial direction on the main track, in order to constitute said two parts of said protection zone.

8. A process according to claim 7, further comprising replacing by lures, on said main track, data items of an application corresponding to data recorded in sectors of said secondary track, such that said lures and the data actually recorded on said main track form a coherent and executable set of data, and when said process reveals that the disk is a copy, reading of the genuine and the lure data on said main track allows the application to continue executing in a degraded manner.

9. A process according to claim 7, further comprising a stage to verify the physical presence of said secondary track.

10. A process according to claim 9, wherein said verification of the physical presence of said secondary track is based on verification of the durations of different processes and/or reads carried out on said disk.

11. A process according to claim 10, wherein said verification of the physical presence of said secondary track includes measuring the time necessary for the reading of all the sectors between an address preceding the first address of said protection zone and an address after the last address of this protection zone.

12. A process according to claim 10, wherein said verification of the physical presence of said secondary track includes measuring a time necessary for the reading of all the sectors having an address between the first address of said protection zone and the last address of said protection zone, starting from one of said jump zones, then measuring the time necessary for the reading of all the sectors having an address between the first address of said protection zone and an address after the last address of this said protection zone, starting from the same jump zone, and finally comparing said reading times.

13. A process according to claim 12, further comprising a read, starting from the other jump zone, of the sectors of addresses between an address preceding a last address of said protection zone and an address after the last address of said protection zone, and checking said identifiers detected during this reading.

14. A copy-protected optical disk including at least one spiral track having information marks written in sectors having substantially sequential addresses along the at least one spiral track, the disk comprising:

a copy protection zone; and specific protection data recorded on the disk, wherein the copy protection zone includes at least two parts of equal size, the at least two parts each including a series of sectors designated by identical addresses, data written in the copy protection zone is shared between the series of sectors of the two parts, each sector of the copy protection zone includes an identifier related to a part in which each sector is contained, and the specific protection data is configured to enable verification of a presence and contents of the copy protection zone and to enable use of the data written in the copy protection zone.

15. The optical disk according to claim 14, further comprising:
   a continuous spiral main track including main sectors and configured to cover a useful part of the disk;
   at least one secondary track inserted between turns of the main track and including adjacent sectors positioned adjacent to the main sectors,
   wherein the main sectors have substantially sequential addresses along the main track and the adjacent sectors have identical addresses, thereby constituting the at least two parts of the copy protection zone.

16. The optical disk according to claim 15, wherein a pitch of the main track is maintained over substantially all of the disk when the at least one secondary track is inserted.

17. A copy protection process for determining if an optical disk is an original disk or a copy and to prevent normal use of the copy, the original disk including at least one spiral main track having information marks written in sectors having substantially sequential addresses along the at least one spiral main track, the process comprising:
   defining on the original disk a protection zone having at least two parts of equal size and each having at least one identifier, the at least two parts each including a series of sectors having identical addresses, wherein data written in the copy protection zone is shared between the series of sectors of the at least two parts;
   reading at least two predetermined sectors of the protection zone a plurality of times; and
   using the at least one identifier for each of the at least two parts to verify that the at least two predetermined sectors were accessed during the reading.

18. The copy protection process according to claim 17, further comprising:
   defining on the original disk a forward jump zone and a backward jump zone on at least one side of the protection zone,
   wherein the reading includes a first series of reads beginning in the forward jump zone and a second series of reads starting from the backward jump zone.

19. The copy protection process according to claim 17, wherein when the using determines that the two predetermined sectors were not accessed, the using is repeated on other sectors of the protection zone.

20. The copy protection process according to claim 17, wherein the original disk includes at least one secondary track inserted between spirals of the at least one spiral main track, and the two parts of the protection zone are comprised of a first part of successive sectors on the at least one spiral main track and a second part of successive sectors on the at least one secondary track, adjacent to the first part.

21. The copy protection process according to claim 20, further comprising verifying existence of the at least one secondary track.

22. The copy protection process according to claim 21, wherein the verifying comprises:
   measuring a first time for reading sectors having an address between a first address of the protection zone and a last address of the protection zone, beginning in at least one of the forward jump zone or the backward jump zone;
   measuring a second time for reading sectors having an address between the first address of the protection zone and the last address of the protection zone, beginning in the at least one of the forward jump zone or the backward jump zone; and
   comparing the first time and the second time.

23. The copy protection process according to claim 21, wherein the verifying verifies at least one duration of a process or a read of the original disk.

24. The copy protection process according to claim 23, wherein the verifying includes measuring a time necessary for reading all sectors between an address preceding a first address of the protection zone and an address after a last address of the protection zone.

25. The copy protection process according to claim 23, further comprising:
   second reading in at least one of the forward jump zone and backward jump zone sectors between an address preceding the last address of the protection zone and an address after the last address of the protection zone; and
   checking identifiers detected during the second reading.

26. The copy protection process according to claim 17, further comprising:
   replacing at least one portion of the data with at least one lure on the main track, the at least one lure corresponding to data recorded in sectors of the at least one secondary track,
   wherein the at least one lure and the data form an executable set of data for an application, and
   when the copy is present, the at least one lure and the data allow degraded execution of the application.

* * * * *